United States Patent [19]

Kirchmeyer et al.

[11] Patent Number: 5,739,252
[45] Date of Patent: Apr. 14, 1998

[54] THERMOPLASTIC POLYURETHANEUREA ELASTOMERS

[75] Inventors: Stephan Kirchmeyer, Leverkusen; Hanns Peter Müller, Odenthal; Martin Ullrich, Leverkusen; Ulrich Liesenfelder, Gladbach, all of Germany

[73] Assignee: Bayer Aktiengesellschaft, Leverkusen, Germany

[21] Appl. No.: 657,852

[22] Filed: May 31, 1996

[30] Foreign Application Priority Data

Jun. 7, 1995 [DE] Germany ............................ 19520731.9

[51] Int. Cl.$^6$ .................................................. C08G 18/10
[52] U.S. Cl. ............................. 528/59; 528/85; 264/165
[58] Field of Search ........................ 528/59, 85; 264/165

[56] References Cited

U.S. PATENT DOCUMENTS

| | | | |
|---|---|---|---|
| 4,049,632 | 9/1977 | Magnusson et al. | 260/75 NE |
| 4,062,834 | 12/1977 | Gilding et al. | 260/77.5 AA |
| 4,286,080 | 8/1981 | Quiring et al. | 525/455 |
| 5,360,885 | 11/1994 | Orthmann et al. | 528/49 |
| 5,545,707 | 8/1996 | Heidingsfeld et al. | 528/60 |

FOREIGN PATENT DOCUMENTS

| | | |
|---|---|---|
| 798427 | 11/1968 | Canada . |
| 2133239 | 10/1993 | Canada . |
| 087817 | 9/1983 | European Pat. Off. . |
| 2823762 | 12/1978 | Germany . |

OTHER PUBLICATIONS

Houben–Weyl, Methoden der Organischen Chemie vol. E 20, G Thieme Verlag 1987 (month unavailable) pp. 1568–1571.

*Primary Examiner*—Rachel Gorr
*Attorney, Agent, or Firm*—Joseph C. Gil; Aron Preis

[57] ABSTRACT

Thermoplastic polyurethaneurea elastomers prepared from organic polyisocyanates (A) and a mixture (B) containing Zerewitinoff active hydrogen atoms are disclosed. The mixture (B) is prepared from 1) 40 to 85 equivalent-% (relative to isocyanate groups in (A)) of one or more compounds having an average of at least 1.8 Zerewitinoff active hydrogen atoms and a number average molecular weight of 400 to 10,000, 2) 10 to 60 equivalent-% (relative to isocyanate groups in (A)) of water and 3) 0 to 45 equivalent-% (relative to isocyanate groups in (A)) of one or more chain extenders having an average of at least 1.8 Zerewitinoff active hydrogen atoms and a molecular weight of 62 to 400. The preparation process comprise mixing (A) and (B) in a static mixer under conditions in which no reaction occurs between (A) and (B), and reacting the mixture in a second static mixer. The resulting polyurethaneurea elastomer is useful for the production of moldings.

4 Claims, No Drawings

THERMOPLASTIC POLYURETHANEUREA ELASTOMERS

This invention relates to thermoplastic polyurethaneurea elastomers, to a process for the production thereof and to the use thereof.

Thermoplastic polyurethanes (TPU) are of significance by virtue of their characteristic elastomeric properties. Unreinforced polyurethanes encompass a hardness range from Shore A 75 to Shore D 75, i.e. ranging from the harder thermoplastics to rubber and plasticized PVC. For certain applications (toys, household articles, automotive), there is increased interest in replacing rubber and plasticized PVC with TPU, as these are recyclable, have markedly better mechanical properties than rubber and, when incinerated, produce no acidic products. However, the requirement is for TPU with a hardness of less than Shore 75 A with good elastomeric properties.

While the hardness of TPU may in principle be adjusted by means of the quantity ratio of the starting materials, the so-called rigid/soft segment ratio (c.f. Houben-Weyl, *Methoden der Organischen Chemie*, volume E 20, G. Thieme Verlag 1987, pages 1568–1571), problems of heat resistance, mechanical properties and low-temperature flexibility arise with soft TPU. Such TPU then have inadequate strength, have a tendency to stick and are difficult to demold when injection molded. Soft TPU moreover crystallize relatively readily, i.e. their hardness slowly rises within a period of hours or days, so rendering them unusable as synthetic resins.

Polyurethaneureas are polyurethanes with additional urea groups. Soft polyurethaneureas generally have better mechanical and thermal properties than soft polyurethanes. They are not, however, melt processable.

Polyurea elastomers with singular, i.e. unpaired, urea groups are an exception. Polyurethaneurea elastomers with singular urea groups can only be produced by the reaction of isocyanate groups with water as the reaction of isocyanate groups with diamines always produces paired urea groups. Processes for the production of thermoplastic polyurethaneureas by reacting isocyanate groups with water are known, but the products and the processes for the production thereof are not satisfactory.

The thermoplastic polyurethaneurea elastomers obtained according to DE-OS 1,645,003 contain polyurea in the form of specks and non-homogeneous zones and are therefore unusable. The production processes according to U.S. Pat. No. 4,049,632 and U.S. Pat. No. 4,062,834 are not suitable for industrial performance as large quantities of solvents are required. In the production of thermoplastic polyurethaneurea elastomers according to EP-A-21,323, the water required for the reaction must be added under such high pressure and at such high temperatures that the product is damaged during production.

The object of the invention is to provide thermoplastic polyurethaneurea elastomers, in particular with a hardness of 75 to 55 Shore A, which have excellent mechanical and thermal properties and simultaneously do not have the stated disadvantages. A further object is the continuous production of these thermoplastic polyurethaneurea elastomers on the industrial scale (i.e. for example in multi-screw injection molding machines or extruders).

It has been found that, in order to obtain thermoplastic polyurethaneurea elastomers with greatly improved properties, the isocyanate must be mixed with the isocyanate-reactive component—including water—in a static mixer under conditions in which the two components remain substantially unreacted and the reaction must then be performed in a second static mixer.

This is completely unexpected as the reaction of isocyanates with water is a heterogeneous reaction at the interface between two phases. If the two phases are present in the form of coarse particles, then lumps and specks and insoluble polyurea are formed. In order to avoid this, small particles must be formed, which may only be achieved by applying considerable shear energy. Once this energy is removed, such mixtures very rapidly segregate, i.e. two coarsely divided phases reform with the reaction proceeding at the phase interface. However, according to the invention, no such elevated shear energy is made available for mixing the two phases during the second stage, i.e. during the reaction of the isocyanate groups with water. Homogeneous polyurethaneurea elastomers with improved properties are nevertheless obtained.

The present invention provides a process for the production of thermoplastic polyurethaneurea elastomers comprising (a) introducing and homogeneously mixing (A), (B) and optionally (C) in a first static mixer at a shear rate of 500 to 50,000 $s^{-1}$ and at a temperature of 50° to 250° C., to form a substantially unreacted mixture and (b) reacting said substantially unreacted mixture in a second static mixer operating as a shear rate of 1 to 100 $s^{-1}$ and a temperature of 50° to 250° C., to form thermoplastic polyurethaneurea elastomer, wherein (A) denotes one or more polyisocyanates, and where (B) denotes a mixture of (B1) and (B2) and (B3) where (B1) is 40 to 85 equivalent-% (relative to the isocyanate groups in (A)) of one or more compounds having an average of 1.8 to 3.0 Zerewitinoff active hydrogen atoms and a number average molecular weight of 400 to 10,000, preferably of 450 to 6,000, particularly preferably of 600 to 4,500,and where (B2) is 10 to 60 equivalent-% (relative to the isocyanate groups in (A)) of water, and where (B3) is 0 to 45 equivalent-% (relative to the isocyanate groups in (A)) of one or more chain extenders having an average of 1.8 to 3.0 Zerewitinoff active hydrogen atoms and a molecular weight of 62 to 400, and where (C) is 0 to 20% (relative to the weight of said thermoplastic polyurethaneurea elastomer) of conventional auxiliary additives.

The present invention furthermore provides the thermoplastic polyurethaneurea elastomers obtained in this manner.

The present invention also provides the use of the thermoplastic polyurethaneurea elastomers for the production of moldings (for example by casting, compression molding, injection molding), such as sheets, containers, equipment components, casings, rollers, gears, machinery and vehicle components, rolls, elastic coatings, films, sheathing, tubes, catheters, seals, profiles, bearing bushes and filaments.

Isocyanates (A) which may be used are aliphatic, cycloaliphatic, araliphatic, aromatic and heterocyclic polyisocyanates or any desired mixtures of these polyisocyanates (c.f. Houben-Weyl, *Methoden der Organischen Chemie*, volume E 20, *Makromolekulare Stoffe*, Georg Thieme Verlag, Stuttgart, New York 1978, pages 1587–1593). Examples are ethylene diisocyanate, 1,4-tetramethylene diisocyanate, 1,6-hexamethylene diisocyanate, 1,12-dodecane diisocyanate, 1,3-cyclobutane diisocyanate, 1,3- and 1,4-cyclohexane diisocyanate together with any desired mixtures of these isomers, 1-isocyanato-3,3,5-trimethyl-5-isocyanatomethylcyclohexane, 2,4- and 2,6- hexahydrotolylene diisocyanate together with any desired mixtures of these isomers, hexahydro-1,3- and/or-1,4-phenylene diisocyanate, perhydro-2,4'- and/or -4,4'-diphenylmethane diisocyanate, norbornane diisocyanates (for example U.S. Pat. No. 3,492,330), 1,3- and 1,4-phenylene diisocyanate, 2,4- and 2,6-tolylene diisocyanate together with any desired mixtures of these isomers, 2,4'- and/or 4,4'-diphenylmethane diisocyanate.

Aromatic diisocyanates are preferred, in particular optionally alkyl-substituted tolylene and diphenylmethane diisocyanates, aliphatic diisocyanates, in particular hexamethylene diisocyanate and cycloaliphatic diisocyanates such as 1-isocyanato-3,3,5-trimethyl-5-isocyanatomethylcyclohexane, perhydro-2,4'- and/or -4,4'-diphenylmethane diisocyanate.

Isocyanates having a higher functionality may also be used, such as 4,4',4"-triphenylmethane triisocyanate, polyphenyl/polymethylene polyisocyanates (for example obtained by aniline/formaldehyde condensation and subsequent phosgenation), together with the distillation residues containing isocyanate groups which arise during industrial isocyanate production, optionally dissolved in one or more of the above-stated polyisocyanates. However, care must be taken in this case to ensure that an average functionality of two is not substantially exceeded if the polyurethanes are to be melt processed. It may optionally be necessary to compensate for reactants with an elevated functionality by also using other reactants with a functionality of lower than two.

Monofunctional isocyanates suitable for this purpose are, for example, stearyl isocyanate, cyclohexyl isocyanate and phenyl isocyanate.

Zerewitinoff active compounds (B1) are compounds having an average of 1.8 to 3.0 Zerewitinoff active hydrogen atoms and a number average molecular weight of 400 to 10,000.

Such include compounds containing amino groups, thiol groups or carboxyl groups, in particular compounds containing two to eight, preferably two hydroxyl groups, especially those of a number average molecular weight of 450 to 6,000, particularly preferably those of a molecular weight of 600 to 4,500, for example polyesters, polyethers, polycarbonates and polyesteramides containing hydroxyl groups.

Suitable polyesters include reaction products of polyhydric, preferably dihydric and optionally also trihydric alcohols with polybasic, preferably dibasic carboxylic acids or the esterifiable derivatives thereof. The polycarboxylic acids may be of an aliphatic, cycloaliphatic, aromatic and/or heterocyclic nature, may be, for example, substituted by halogen atoms and/or unsaturated.

Examples of such carboxylic acids and the derivatives thereof include succinic acid, adipic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, maleic acid, maleic anhydride, fumaric acid, dimerised and trimerised unsaturated fatty acids, optionally mixed with monomeric unsaturated fatty acids, terephthalic acid dimethyl ester and terephthalic acid bisglycol ester.

Polyhydric alcohols include ethylene glycol, 1,2- and 1,3-propylene glycol, 1,4- and 2,3-butylene glycol, 1,6-hexanediol, 1,8-octanediol, neopentyl glycol, 1,4-bis(hydroxymethyl)cyclohexane, trimethylolpropane, trimethylolethane, together with di-, tri-, tetra- and higher polyethylene glycols, di- and higher polypropylene glycols, together with di- and higher polybutylene glycols. The polyesters may contain a proportion of terminal carboxyl groups. Polyesters prepared from lactones, for example ε-caprolactone, or from hydroxycarboxylic acids, for example ω-hydroxycaproic acid, may also be used. It is, however, also possible to use hydroxy-functional polyesters known from fats chemistry, such as for example castor oil, and the transesterification products thereof.

Suitable polyethers which are known per se may be produced by the polymerization of epoxides, such as ethylene oxide, propylene oxide, butylene oxide, styrene oxide or epichlorohydrin or of tetrahydrofuran with itself, for example in the presence of Lewis catalysts such as boron trifluoride, or by the addition of epoxides, preferably of ethylene oxide and propylene oxide, optionally mixed or in succession, onto starter components with reactive hydrogen atoms such as water, alcohols, ammonia or amines, for example ethylene glycol, 1,3- or 1,2-propylene glycol, water, 4,4'-dihydroxydiphenyl-propane, aniline, ethanolamine or ethylenediamine.

Polycarbonates containing hydroxyl groups are known per se; these may be produced by the reaction of diols such as 1,3-propanediol, 1,4-butanediol and/or 1,6-hexanediol, diethylene glycol, triethylene glycol, tetraethylene glycol or thiodiglycol with diaryl carbonates, for example diphenyl carbonate, or phosgene (DE-OS 1,694,080; 2,221,751).

Suitable polyesteramides and polyamides include the predominantly linear condensation products obtained from polybasic saturated or unsaturated carboxylic acids or the an hydrides thereof and polyfunctional, saturated or unsaturated amino alcohols, diamines, polyamines and the mixtures thereof.

Polyhydroxy compounds containing high molecular weight polyaddition or polycondensation products or polymers in a finely dispersed, dissolved or graft-polymerized form are also suitable. Such modified polyhydroxy compounds may be obtained, for example, if polyaddition (for example reaction of polyisocyanates with amino-functional compounds) or polycondensation (for example of formaldehyde with phenols and/or amines) is allowed to proceed in the presence of the compounds containing hydroxyl groups. Such processes are described, for example, in DE-AS 1,168, 075 and 1,126,142, as well as DE-OS 2,324,134; 2,423,984; 2,512,385; 2,513,815; 2,220,796; 2,550,797; 2,550,833; 2,550,862; 2,633,293 and 2,639,254. It is, however, also possible according to U.S. Pat. No. 3,869,413 or DE-OS 2,550,860 to mix a ready-produced aqueous polymer dispersion with a polyhydroxy compound and then to remove water from the mixture.

Polyhydroxyl compounds modified by vinyl polymerization are also suitable, as are, for example, obtained by the polymerization of styrene and acrylonitrile in the presence of polyethers (U.S. Pat. No. 3,383,351; 3,323,093; 3,110, 695, DE-AS 1,152,536) or polycarbonate polyols (DE-PS 1,769,795, U.S. Pat. No. 3,637,909). Polybutadienes containing hydroxyl groups are also suitable.

Naturally, mixtures of the above-stated compounds having at least two isocyanate-reactive hydrogen atoms and a molecular weight of 400 to 10,000 may also be used, for example mixtures of polyethers and polyesters.

Zerewitinoff active compounds (B3)—chain extenders—have an average of 1.8 to 3.0 Zerewitinoff active hydrogen atoms and a molecular weight of 62 to 400. These compounds include compounds containing amino groups, thiol groups or carboxyl groups and those with two to eight, preferably two hydroxyl groups.

Examples of compounds (B3) are di- and polyols such as ethylene glycol, 1,2- and 1,3-propylene glycol, 1,4- and 2,3-butylene glycol, 1,5-pentanediol, 1,6-hexanediol, 1,8-octanediol, neopentyl glycol, 1,4-bis(hydroxymethyl)

cyclohexane, 2-methyl-1,3-propanediol, glycerol, trimethylolpropane, 1,2,6-hexanetriol, trimethylolethane and pentaerythritol, di-, tri-, tetra- and higher polyethylene glycols with a molecular weight of up to 400, together with di- and higher polypropylene glycols with a molecular weight of up to 400, 4,4'-dihydroxydiphenylpropane, di(hydroxymethyl)hydroquinone, ethanolamine, diethanolamine, N-methyldiethanolamine, triethanolamine and 3-aminopropanol; aliphatic diamines such as, for example, ethylenediamine, 1,4-tetramethylenediamine, hexamethylenediamine, together with the mixtures thereof, 1-amino-3,3,5-trimethyl-5-aminomethylcyclohexane ("isophoronediamine"), 2,4- and 2,6-hexahydrotoluylenediamine together with the mixtures thereof, perhydro-2,4'- and -4,4'-diaminodiphenylmethane, p-xylylenediamine and bis-(3-aminopropyl)methylamine; aromatic diamines which may be cited are bisanthranilic acid esters, 3,5- and 2,4-diaminobenzoic acid esters, 3,3'-dichloro-4,4'-diaminodiphenylmethane, tolylenediamine and 4,4'-diaminodiphenylmethane.

Compounds which are monofunctional towards isocyanates may also be used in proportions of up to 2 wt. %, relative to the thermoplastic polyurethaneurea elastomer, as chain terminators. Suitable compounds are, for example, monoamines such as butyl- and dibutylamine, octylamine, stearylamine, N-methylstearylamine, pyrrolidine, piperidine and cyclohexylamine, monoalcohols such as butanol, 2-ethylhexanol, octanol, dodecanol, the various amyl alcohols, cyclohexanol and ethylene glycol monomethyl ether.

The isocyanate-reactive compounds must be selected in such a manner that their average functionality does not substantially exceed two, if melt processable polyurethaneurea elastomers are to be produced. If compounds having a higher functionality are to be used, the overall functionality must be reduced to approximately 2 by the addition of monofunctional compounds.

The relative quantities of compounds (B1), (B2) and (B3) in (B) are preferably selected such that the ratio of the total of isocyanate groups in (A) to the total of Zerewitinoff active hydrogen atoms in (B) is 0.9:1 to 1.2:1.

The thermoplastic polyurethaneurea elastomers according to the invention may contain as (C) preferably at most up to 20 wt. % (relative to the total quantity of thermoplastic polyurethaneurea) of further conventional auxiliary substances and additives.

These include, inter alia, per se known catalysts, for example tertiary amines, such as triethylamine, N-methylmorpholine, N-ethylmorpholine, N,N,N',N'-tetramethyleneethylenediamine, pentamethyldiethylenetriamine, 1,4-diazabicyclo[2.2.2]octane, N-methyl-N'-dimethylaminoethylpiperazine (DE-OS 2,636,787), N,N-dimethylbenzylamine, N,N-dimethylcyclohexylamine, 2-methylimidazole, monocyclic and bicyclic amidines (DE-OS 1,720,633), bis-(dialkylamino)alkyl ethers (U.S. Pat. No. 3,330,782, DE-AS 1,030,558, DE-OS 1,804,361; 2,618,280), together with tertiary amines containing amide groups (preferably formamide groups) according to DE-OS 2,523,633 and 2,732,292. Other organic metal compounds, in particular organic tin compounds, may also be used as catalysts. Organic tin compounds which may be considered, apart from compounds containing sulphur such as di-n-octyltin mercaptide (DE-AS 1,769,367, U.S. Pat. No. 3,645,927), are preferably tin(II) salts of carboxylic acids such as tin(II) acetate, tin(II) octcate and tin(II) laurate as well as tin(IV) compounds, such as for example dibutyltin oxide, dibutyltin dilaurate or dioctyltin diacetate. Further compounds which may be considered are: titanium, bismuth and antimony compounds, such as for example antimony triisopropoxide, antimony octcate, antimony tallate, bismuth salts of carboxylic acids with 2 to 20 carbon atoms, such as for example bismuth trioctanoate, dibutylbismuth octanoate, triphenylbismuth didecanoate and dibutyltitanium bis(acetylacetonate).

Further usable catalysts together with details of the mode of action of the catalysts are described in *Kunststoff Handbuch* volume VII, *Polyurethane*, edited by Vieweg and H öchtlen, Carl Hanser Verlag, Munich 1966, for example on pages 96 to 102.

The total quantity of catalysts in the polyurethaneurea elastomers according to the invention is generally approximately 0 to 5 wt. %, preferably 0 to 2 wt. %, relative to the total quantity of polyurethaneurea elastomer.

Further additives and auxiliary substances are, for example: pigments, dyes, flame retardants such as tris (chloroethyl) phosphate, tricresyl phosphate or ammonium phosphate and pyrophosphate, stabilizers to counter the action of ageing and weathering, plasticizers, lubricants and mould release agents, substances with a fungistatic and bacteriostatic action together with fillers such as calcium carbonate, silica gel, barium sulphate, calcium sulphate, kaolin, bentonite, zeolites, ground glass, glass beads, fibers of glass, plastic or carbon, silica sand or silica flour, silicon carbide, aluminum trihydrate, chalk, dolomite or mixtures thereof.

In the first stage of the process, the starting compounds (A), (B) and (C) are mixed in a static mixer under conditions in which (A) and (B) remain substantially unreacted. Shear rates of 500 to 50,000 s$^{-1}$ and temperatures of 50° to 250° C. are suitable, mixing times will preferably range from 0.01 to 5 seconds. It is, however, permissible for up to 10 wt. %, preferably up to 5 wt. %, of the isocyanate groups present in the reactive mixture to react.

The isocyanates (A) may be used as monomeric di- or polyisocyanates or, alternatively, preferably as prepolymers. Prepolymers may be produced by reacting the entire quantity or a proportion of (A) with the entire quantity or a proportion of (B1), optionally in the presence of the auxiliary substances (C), at 30° to 220° C., preferably at 60° to 180° C., particularly preferably at 100° to 160° C. The production of prepolymers containing isocyanate, the processing and use thereof is known in principle (see, for example, *Methoden der organischen Chemie* (Houben-Weyl), volume E 20, G. Thieme Verlag, Stuttgart, New York, 1987, pp. 1613–1617). The prepolymers may be produced discontinuously, for example in a stirred tank, or continuously, for example using the processes described in EP-A 0,571,828 or EP-A 0,571,831.

The mixture leaving the first static mixer is passed through a second static mixer under conditions in which the reaction between (A) and (B) occurs. Shear rates of 1 to 100 s$^{-1}$ are suitable. It is preferred here that at least 30%, preferably at least 60%, particularly preferably 90% of the isocyanate groups in the reactive mixture will have reacted. Conversion is principally dependent upon the temperature of the mixture in the second static mixer and the residence time of the reactive mixture in the second static mixer. Usually, a temperature in the range from 50° to 250° C. be chosen. Preferably, the residence time in the second mixer will be 0.1 to 10 minutes. Conversion rises with rising temperature and rising residence time. It is possible to determine conversion on leaving the second static mixer, for example, by titrimetric determination, for example by reacting the isocyanate groups with an excess quantity of di-n-butylamine and back-titrating with hydrochloric acid.

According to the invention, it is possible to use static mixers for both reaction stages as are, for example, described in Chem.-Ing.-Techn. 52, no. 4 on pages 285 to 291 and in *Mischen von Kunststoff und Kautschukprodukten*, VDI Verlag, Düsseldorf 1993.

Model SMX static mixers from the company Sulzer Chemtech, Winterthur, Switzerland are preferred. It is preferred for mixing purposes to use a static mixer having a shear rate of >100 s$^{-1}$, particularly preferably of >500 s$^{-1}$, and for the reaction a static mixer having a shear rate of <100 s$^{-1}$, particularly preferably of <10 s$^{-1}$. A jet mixer may also be used for rapid mixing of components (A) and (B).

The thermoplastic polyurethaneurea elastomer leaving the second static mixer may optionally be further processed, for example by conditioning the polymer in sheet or block form, comminution or pelletizing in shredders or mills, degassing and pelletizing with melting. The polymer is preferably passed through a unit for continuous degassing and strand formation. This unit may be, for example, a multi-screw injection molding machine or extruder, which is equipped with no, or but a few kneading discs.

The thermoplastic polyurethaneurea elastomers produced using the process according to the invention have markedly better mechanical and thermal properties than comparable polymers produced using prior art processes. This applies in particular to their elastic properties, such as elongation and tensile strength, and thermal properties such as heat resistance. The thermoplastic polyurethaneurea elastomers according to the invention may be processed into moldings in a conventional manner.

EXAMPLE 1

Production of Prepolymer 1

4,000 g (4.0 mol) of poly(oxytetramethylene) glycol having an number average molecular weight of 1,000 g/mol are desiccated for 4 hours at 140° C. and a pressure of 10 mbar in a 6 liter three-necked flask with a mechanical stirrer, internal thermometer and nitrogen inlet. The contents are cooled to 70° C. and 1,500 g (6.0 mol) of 4,4'-diphenylmethane diisocyanate are added, the temperature increased to 100° C. after 10 minutes and stirring is continued for 2 hours at 100° C. A prepolymer having a titratable isocyanate content of 2.52% is obtained.

Production of the Thermoplastic Polyurethaneurea

The reactor consists of two static mixers (SMX, Sulzer AG). Static mixer 1 has a diameter of 6 mm, a length of 35 mm and a shear rate of 500 s$^{-1}$. Static mixer 2 has a diameter of 34 mm, a length of 270 mm, a shear rate of 3 s$^{-1}$ and a heatable jacket, which is heated to 180° C.

5,000 g/h of prepolymer 1 and 65.5 g/h of water are continuously metered into the first static mixer. The mixture leaving static mixer 1 is passed into static mixer 2. The polymer melt leaving static mixer 2 is cooled and post-cured for 16 hours at 110° C. The comminuted polymer is converted into injection molded sheets and the properties of the injection molded sheets are determined. The test specimens produced are waterwhite, homogeneous and completely free of specks.

EXAMPLE V1

(Comparison; extruder process; not according to the invention)

5,000 g/h of prepolymer 1 and 65.5 g/h of water are continuously metered into the feed hopper of a conventional extruder. The temperature profile of the various barrel sections is as follows:

| Barrel section | 1 | 2 | 3 | 4 | 5 | 6 | 7 | Die |
|---|---|---|---|---|---|---|---|---|
| Temp. in °C. | 180 | 200 | 220 | 220 | 200 | 190 | 180 | 190 |

The polymer strand is drawn off from the die, passed through a water bath, pelletized and post-cured for 16 hours at 110° C. Injection molded sheets are produced from the pellets and the sheet properties measured. The specimens produced are turbid and contain coarse inclusions in the form of specks and lumps.

EXAMPLE 3

(Determination of Properties)

| Polymer from example | Tear strength [MPa] | Elongation at break [%] | Softening temperature [°C.] | Glass transition temperature [°C.] | Shore A hardness |
|---|---|---|---|---|---|
| 1 | 33 | 656 | 185 | −53 | 71 |
| V1 | 19.2 | 600 | 110 | −40 | 68 |

Example 1 shows that thermoplastic polyurethaneurea elastomers are obtained using the process according to the invention which exhibit markedly improved mechanical and thermal properties in comparison with the comparative example.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of thermoplastic polyurethaneurea elastomer comprising (a) introducing and homogeneously mixing (A), (B) and optionally (C) in a first static mixer at a shear rate of 500 to 50,000 s$^{-1}$ and at a temperature of 50° to 250° C., to form a substantially unreacted mixture and (b) reacting said substantially unreacted mixture in a second static mixer operating as a shear rate of 1 to 100 s$^{-1}$ and a temperature of 50° to 250° C., to form thermoplastic polyurethaneurea elastomer, wherein (A) denotes one or more polyisocyanates, and where (B) denotes a mixture of (B1) and (B2) and (B3) where (B1) is 40 to 85 equivalent-% (relative to the isocyanate groups in (A)) of one or more compounds having an average of 1.8 to 3.0 Zerewitinoff active hydrogen atoms and a number average molecular weight of 400 to 10000, and where (B2) is 10 to 60 equivalent-% (relative to the isocyanate groups in (A)) of water, and where (B3) is 0 to 45 equivalent-% (relative to the isocyanate groups in (A)) of one or more chain extenders having an average of 1.8 to 3.0 Zerewitinoff active hydrogen atoms and a molecular weight of 62 to 400, and where (C) is 0 to 20% (relative to the weight of said thermoplastic polyurethaneurea elastomer) of conventional auxiliary additives.

2. The process of claim 1 wherein the substantially unreacted mixture contains a prepolymer produced from a proportion of (A) and a proportion of (B1) in the presence of a proportion of (C).

3. The process of claim 1 wherein the thermoplastic polyurethaneurea elastomer formed in said second static mixer is subsequently continuously degassed and extruded.

4. The thermoplastic polyurethaneurea elastomers produced according to the process of claim 1.

* * * * *